Nov. 30, 1965  R. C. HEIDNER ETAL  3,220,396
ENGINE IGNITION CONTROL INDICATING SYSTEM
Filed Nov. 21, 1962  2 Sheets-Sheet 1

INVENTORS.
RICHARD C. HEIDNER
PHILIP A. ANDERSON
BY
Wheeler, Wheeler, Wheeler
ATTORNEYS

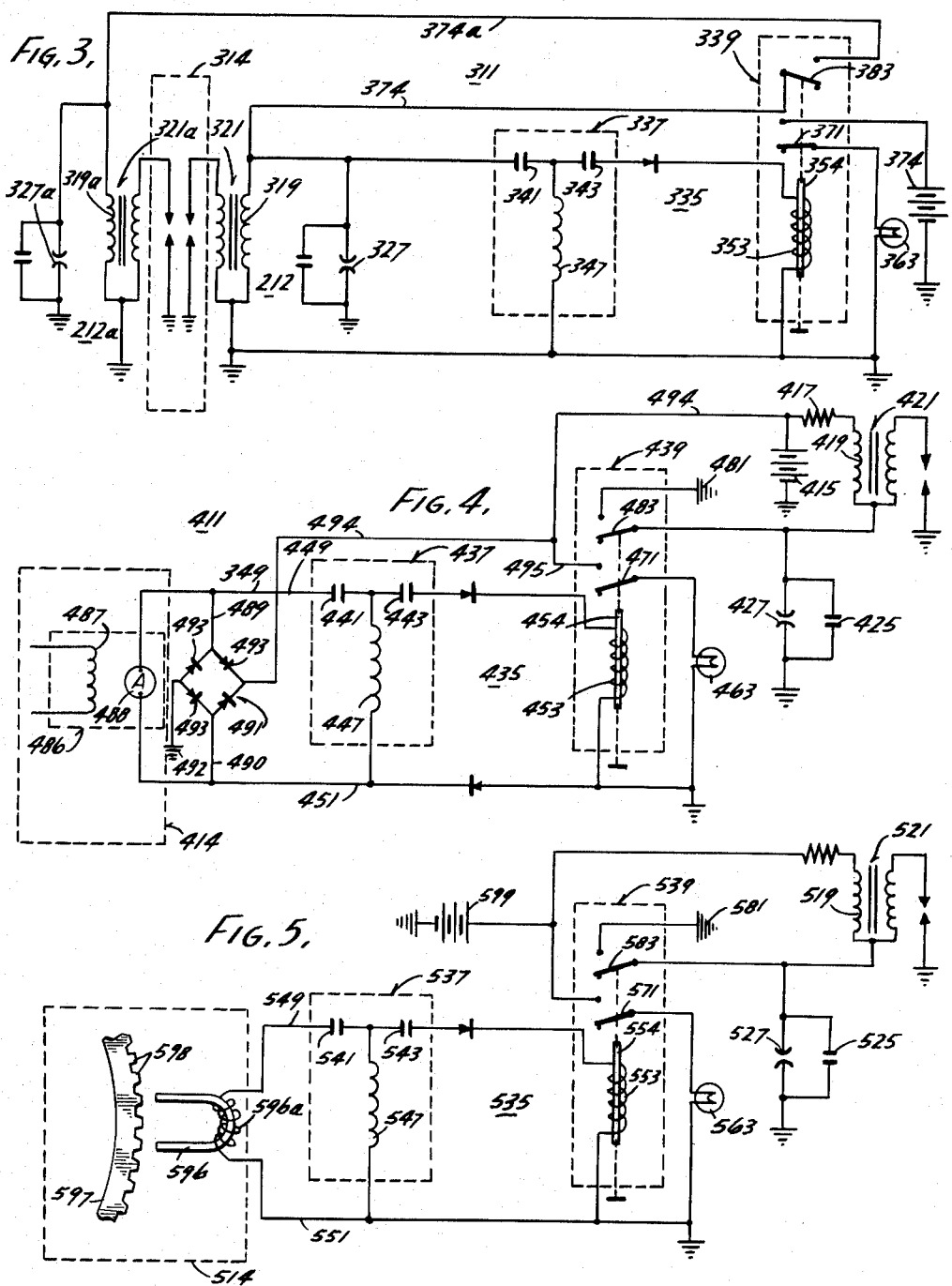

United States Patent Office 3,220,396
Patented Nov. 30, 1965

3,220,396
ENGINE IGNITION CONTROL INDICATING SYSTEM
Richard C. Heidner, Libertyville, and Philip A. Anderson, Waukegan, Ill., assignors to Outboard Marine Corporation, Waukegan, Ill., a corporation of Delaware
Filed Nov. 21, 1962, Ser. No. 239,162
1 Claim. (Cl. 123—148)

The invention relates generally to spark-ignition, internal combustion engines. The invention also relates to ignition systems for spark-ignition, internal combustion engines.

The invention provides an arrangement for indicating a condition of engine speed above a predetermined value or level. In addition, the invention provides an arrangement for automatically rendering the ignition system partially or wholly inoperative upon the occurrence of an engine over-speed condition.

The invention is equally applicable for use with a battery ignition system, either with or without an alternator generator device for charging the battery, and to magneto ignition systems. The invention is also applicable to single as well as multi-cylinder engines and can be employed to prevent firing of one or more cylinders in the event the engine speed exceeds a predetermined rate. In addition, the invention is equally applicable to two and four stroke engines.

In accordance with the invention, an electrical filter is employed to selectively reject or pass pulsating currents generated in response to the rate of crankshaft rotation. The filter can be arranged to pass pulsating current below a specified frequency corresponding to a given engine speed and to reject or prevent passage of current through the filter when the applied pulsating current has a frequency above the specified frequency, whereby discontinuance of the passage of current through the filter can be used to effect an indication of engine over-speed. Alternatively, the filter can be arranged to reject passage of a pulsating current at frequencies below the specified frequency and to pass current at frequencies above the specified frequency so as to effect an indication of engine over-speed. The later arrangement is used in the disclosed embodiments.

In the disclosed embodiments, passage of current through the filter is employed to actuate a relay incorporating a switch member biased by an over-the-center spring action. Thus, after the relay is actuated by passage of current through the filter, the relay must be manually reset to shut off the signal and/or to enable firing of the engine cylinders which may have been deactivated.

In the preferred embodiment, the engine over-speed indicator takes the form of a light or bulb which is energized or lighted in response to passage of current through the filter.

Other objects and advantages of the invention will become known by reference to the following description and the accompanying drawings, in which:

FIGURE 3 is a circuit diagram of a circuit 311 embodying various of the features of the invention;

FIGURE 4 is a circuit diagram of a circuit 411 embodying various of the features of the invention; and FIGURE 5 is a circuit diagram of a circuit 511 embodying various of the features of the invention.

Figure 1:
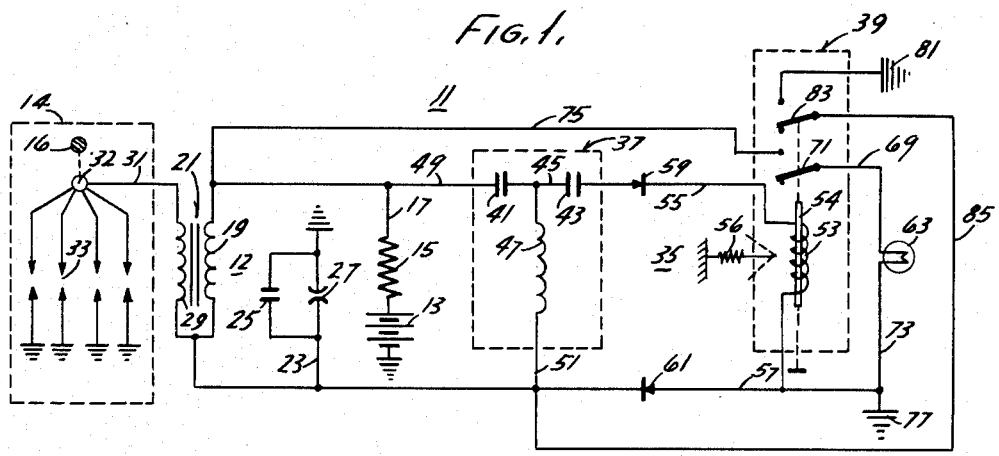
FIGURE 1 is a circuit diagram of a circuit 11 embodying various of the features of the invention.

The circuit 11 is intended for use with a battery ignition system for a spark ignition, internal combustion engine which is indicated diagrammatically at 14 in FIGURE 1 and which includes a crankshaft or other rotatable output member 16 (also shown diagrammatically) and four cylinders. The circuit is also generally usable, however, with single and multiple cylinder engines having other than four cylinders. The circuit 11 includes an ignition portion 12 comprising a battery 13 which is connected through a ballast resistor 15 and through a lead 17 to one end of the primary winding 19 of an ignition coil 21. The other end of the primary winding is connected by a lead 23 to one plate of a condenser 25 and to one of the points of a breaker 27. The other point of the breaker 27 and the other plate of the condenser are grounded. The other end of the primary winding 19 is also connected to one end of a secondary winding 29 which, at its other end, is connected through a lead 31 to a distributor 32 which, in turn, is connected to the several spark plugs 33. Operation of the distributor and opening and closing of the points can be coordinated in the usual fashion.

Connected across the primary winding 19 is a frequency sensitive portion of sub-circuit 35 of the circuit 11, which portion includes frequency filtering means in the form of a filter 37 and actuating means in the form of a relay 39. More specifically, the filter 37 includes a pair of capacitors 41 and 43 connected by a lead 45 and a coil 47 connected at one end to the lead 45 extending between the capacitors 41 and 43. When using the disclosed construction with a single ignition coil, a four cylinder engine, and a desired cut-out speed of 5400 r.p.m., each of the capacitors has a capacitance of .08 microfarads while the coil has an inductance of 1.2 henrys. The filter 37 is connected to one end of the primary winding 19 by a lead 49 extending from the capacitor 41, and to the other end of the primary winding 19 by a lead 51 extending from the other end of the coil 47.

The relay 39 includes a direct current resistance coil 53 which, in the disclosed construction has a resistance of 5500 ohms, and which controls a plunger or switch member 54 which is conventionally constructed for over-the-center action, including a spring shown diagrammatically at 56, and must be manually reset after each actuation of the coil 53. The coil 53 is connected through the lead 51 joining the other end of the coil 47 to the other end of the primary winding 19. In order to restrict current flow in one direction through the relay coil 53, diodes 59 and 61 are respectively incorporated as shown in the leads 55 and 57.

Figure 1A:
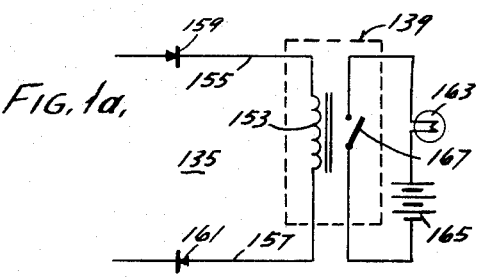
FIGURE 1a is a fragmentary circuit diagram showing a simplified arrangement as compared to the circuit shown in FIGURE 1.

Various means can be utilized for signaling the operator in the event of an engine over-speed condition. The disclosed construction utilizes the lighting or energizing of an indicator light or bulb. In one form of the invention, as shown in FIGURE 1a, a light 163 is energized by a battery 165 or other source of electrical energy separate from the ignition system by closure of a switch 167 when a coil 153 is energized incident to passage of current through an associated filter, such as the filter 37 shown in FIGURE 1.

In FIGURE 1, actuation of the relay 39 serves to connect the light 63 to the battery 13 independently of the filter 37 and to ground said other end of the primary coil 19, thereby rendering the ignition system inoperable. Specifically, displacement of the plunger 54 incident to energizing of the relay coil 53 operates the switch blade 71 to connect the lead 69 to a lead 75 connected to the lead 17 extending from the ballast resistor 15 and the battery 13. In order to complete a circuit through the battery 13, the lead 73 from the light 63 also extends to a ground 77.

The ignition system is rendered inoperative in response to energizing of the relay coil 53 by the connection of a ground 81 through a switch blade 83 to a lead 85 connected to the other end of the primary winding 19. As a result, there is provided a completed circuit through the battery 13 and the primary winding 19, rendering opening and closing of the breaker points 27 ineffective to cause ignition.

In operation of the circuit 11, opening and closing of the breaker points 27 under normal operating speeds sets up a pulsating current which is rejected by the filter 37. However, in the event the engine speed exceeds a specified rate, the frequency of the resulting pulsating current is accepted by the filter 37, resulting in the passage of a current through the filter to energize the relay coil 53. Energizing of the relay coil, as already noted, serves to connect the light 63 directly to the battery 13 and to connect the other end of the primary winding to the ground 81 so as to prevent continued ignition of the engine. In order to restart the engine, the plunger 54 must be reset to disconnect the other end of the primary winding from the ground 81, and to disconnect the direct connection of the light 63 to the battery 13.

Figure 2:
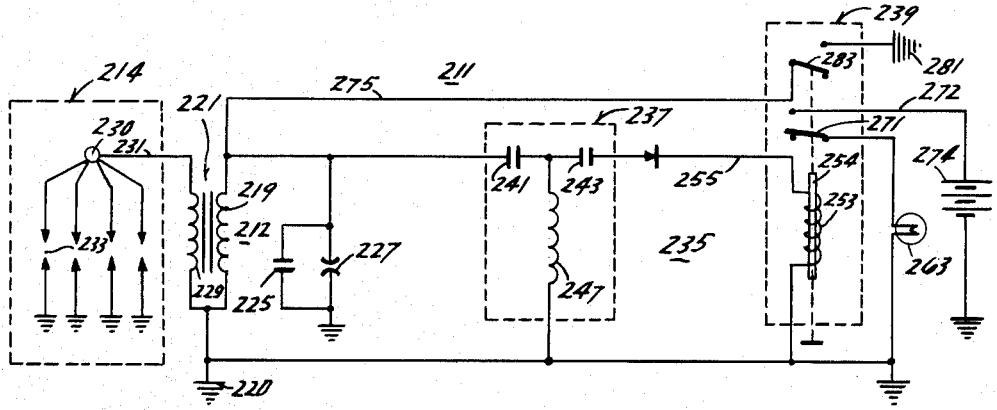
FIGURE 2 is a circuit diagram of a circuit 211 embodying various of the features of the invention.

The circuit 211 (shown in FIGURE 2) is intended for use with a magneto ignition system for a four cylinder engine. However, the circuit can be used for engines having more or less than four cylinders. The ignition portion 212 of the circuit 211 conventionally includes an ignition coil 221 incorporating a primary winding 219 which is connected, at one end, to one plate of a condenser 225 and to one point of a breaker 227 and which, at its other end, is connected to a ground 220. The other plate of the condenser 225 and the other point of the breaker 227 are grounded. The ignition coil 221 also conventionally incudes a secondary winding 229 which is grounded by attachment to said other end of the primary winding 219 and which, at its other end, is connected through a lead 231 to a distributor 230 which, in turn, is connected to the several spark plugs 233. Although the circuit 211 could be used, together with a distributor in connection with a two cylinder engine, it has been found more economical to use two ignition coils and two breakers, as shown in FIGURE 3, rather than to use a distributor.

The frequency-sensitive portion 235 of the circuit 211 is connected across the primary winding 219 and includes a filter 237 and a relay 239. The portion 235 of the circuit 211 is generally identical to the portion 35 of the circuit 11 shown in FIGURE 1, except that the capacitors 241 and 243 in the filter 237 are rated at 0.16 microfarads and the coil 247 is rated at 2.4 henrys. Operation of the relay plunger 254 serves to connect blade 271 to a lead 272 connected to an auxiliary source of electrical current, as for instance, a battery 274. Operation of the plunger 254 incident to energizing of the relay coil 253 also serves through switch blade 283 to connect a lead 275 extending from the first mentioned end of the primary winding 219 to a ground 281. As a result, both ends of the primary winding 219 are grounded and the breaker 227 is ineffective to cause firing of the spark plugs.

In operation, the ignition portion 221 of the circuit 211 sets up an alternating curent which is proportional to engine speed. The frequency-sensitive portion of the circuit operates in substantially identical manner as in the circuit 11 shown in FIGURE 1 to cause actuation of the plunger 254.

The circuit 311, shown in FIGURE 3, is intended for use with a two cylinder, magneto ignition engine and is generally similar to the circuit 211 except that a second magneto ignition coil 321a is included and the switch blade 383 serves, in response to energizing of the relay coil 353, to connect a lead 374 extending from the first mentioned end of the primary winding 319 in the ignition coil 321 to a lead 374a connected to the corresponding end of the primary winding 319a in the second ignition coil 321a, thereby establishing a closed circuit to render ineffective the operation of the breakers 327 and 327a. If desired, the primary winding 319 could be connected through the switch blade 383 to a ground, thereby rendering ignition coil 321 inoperative but permitting continued operation of ignition coil 321a. In the filter 337 the capacitors 341 and 343 are rated at 0.32 mirofarad and the coil 347 is rated at 4.7 henrys.

The operation of the circuit 311 is substantially the same as that of the circuit 211.

The circuit 411 is intended for use with a battery ignition system including an alternator generator 486 for charging a battery 415. The alternator generator 486 includes a field winding 487 and a rotating armature 488 which produces an alternating current having a frequency proportional to the rate of engine speed. The circuit 411 includes a frequency-sensitive portion 435 which is connected by leads 449 and 451 to the armature 488 and which is substantially identical to the portion 35 of the circuit 11, except that the capacitors 441 and 443 in the filter 437 are rated at 0.02 microfarad and the coil 447 is rated at 270 millihenrys.

Connected in parallel with the circuit portion 435 by leads 489 and 490 respectively connected to the leads 449 and 451 is a conventional full-wave rectifying bridge 491 which is grounded as shown at 492, which includes a series of diodes 493, and which delivers direct current through a lead 494 connected to one end of the battery 415 and through a ballast resistor 417 to a conventional ignition system including an ignition coil 421, a condenser 425, and a breaker 427.

The relay plunger 454 can be of the over-the-center type disclosed in the construction shown in FIGURE 1 and operates, incident to passage of current through the relay coil 453, to connect the switch blade 471 to a lead 495 connected to the lead 494 joining the rectifying bridge 491 and the battery 415, thereby connecting a circuit to the battery for operation of the indicator light 463. In addition, a blade 483 operates, when the plunger 454 is displaced in response to energizing of the relay coil 453, as in the circuit 11, to connect the end of the primary winding 419 joined to the points 427 and condenser 425 to a ground 481.

Operation of the circuit 411 is generally similar to the operation of the circuit 11, except that the alternator produces the pulsating current which is applied to the filter 437 and which is either rejected or passed so as to operate the relay 439.

The circuit 511, shown in FIGURE 5, may be used with either a battery or magneto system and includes a frequency-sensitive portion 535 which is substantially identical to the portion 35 described with respect to the circuit 11, except that the capacitors 541 and 543 in the filter 537 are rated at 0.004 microfarad, and the coil 547 is rated at 61 millihenrys. In the circuit 511 the alternating current which is applied to the filter 437 is generated by means of a horseshoe magnet 596 having a coil or winding 596a connected to the leads 549 and 551 and a ring gear 597 which can form a part of a flywheel mounted on the crankshaft or can be mounted on another shafting having a speed proportional to engine speed. The ring gear 597 has teeth 598 which, as they pass the ends of the horseshoe magnet 596, operate to induce a pulsating current in the coil 596a proportional to the rate of engine speed.

The plunger 554 in the relay 539 operates, incident to energizing of the relay coil 553, to connect the switch blade 571 with a battery 599 in like manner to the action of the circuit 211. The plunger 554 also operates through a switch blade 583 to connect a ground 581 to the primary winding 519 of an ignition coil 521, either to the non-grounded end thereof, as shown in the magneto systems shown in FIGURES 2 and 3, or to the end of the primary winding connected to the breaker, as shown in FIGURE 5 and in the battery system illustrated in FIGURE 1.

In use, operation of the engine causes rotation of the ring gear 597 past the horseshoe magnet 596 to produce a pulsating current having a frequency proportional to engine speed. Such pulsating current is applied to the filter 537 and is accepted or rejected in accordance with its frequency to cause operation of the relay 539 to obtain the results already described.

Each of the foregoing circuits provides an arrangement whereby a pulsating current having a frequency proportional to engine speed is utilized to provide a signal to the engine operator in response to the creation of an engine over-speed condition. In FIGURES 1, 2, 3, 4, and 5, the circuit also operates to deactivate the ignition system to cause at least partial halting of the engine operation.

Although the circuits have been disclosed in connection with internal combustion engines, the warning light or signalling feature can be used in connection with any type of motor or rotatable shafting.

As used in the claim, the term "connected" is not intended to necessarily require direct mechanical connection, but is used in the sense of "electrically coupled to."

Various of the features of the invention are set forth in the following claim.

What is claimed is:

The combination of a light, a four cylinder engine including a crankcase and a crankshaft rotatable in said crankcase, a magneto ignition system for said engine including a single ignition coil comprising primary and secondary windings, a first ground connected to one end of said primary coil, and a breaker connected to the other end of said primary coil and operable in response to crankshaft rotation to connect and disconnect said primary coil to a second ground, filter means comprising a first capacitor electrically connected to one end of said primary winding, a second capacitor connected in series with said first capacitor by a lead, said capacitors each having a capacitance of .08 microfarad, and a coil having an inductance of 1.2 henrys and being connected to the other end of said primary winding and to said lead connecting said capacitors, said filter means being operable to selectively prevent passage of current pulsating within a first frequency range and for permitting passage of current pulsating within a second frequency range, a relay including a direct current resistance coil having a resistance of 5500 ohms and electrically connected to said filter means and operated by the current passing through said filter means, diode means interposed between said relay and said filter means for permitting passage of only direct current to said coil, and a single throw two-pole switch operated by said relay and connected to said light and to a source of electrical energy for connecting said light to said source and connected to the end of said primary winding connected to said breaker and to a third ground for connecting said primary winding to said third ground to short said ignition system independently of said breaker, said switch being operable to connect said light to said source of electrical energy and to short said ignition system in response to energizing of said coil, said switch including spring means acting intermediate the throw of said switch whereby said switch is of over-the-center type, and whereby said switch is manually resetable after energizing of said relay coil.

References Cited by the Examiner
UNITED STATES PATENTS

| | | | |
|---|---|---|---|
| 742,976 | 11/1903 | Ehret | 317—19 |
| 2,060,721 | 11/1936 | Bird | 123—148 |
| 2,319,835 | 5/1943 | Williams | 317—19 |
| 2,510,296 | 6/1950 | Root | 123—148 |
| 2,748,182 | 5/1956 | Ericson | 123—148 |
| 2,881,587 | 4/1959 | Loudon | 123—148 |

RICHARD B. WILKINSON, *Primary Examiner.*